United States Patent [19]
Goldenberg et al.

[11] 3,899,474
[45] Aug. 12, 1975

[54] PROCESS FOR MANUFACTURING HYDROGENATED POLYMERS FROM CONJUGATED DIOLEFINS

[75] Inventors: Emmanuel Goldenberg, Poissy; François Dawans, Bougival; Jean-Pierre Durand, Rueil-Malmaison; Germain Martino, Poissy, all of France

[73] Assignee: Institut Français du Petrole des Carburants et Lubrifiants, France

[22] Filed: Dec. 26, 1973

[21] Appl. No.: 428,046

Related U.S. Application Data

[63] Continuation-in-part of Ser. No. 267,523, June 29, 1972, abandoned.

[30] Foreign Application Priority Data
July 5, 1971 France .............................. 71.24566

[52] U.S. Cl. ....... 260/94.3; 260/94.7 H; 260/96 HY; 252/431; 252/430
[51] Int. Cl. ........ C08d 5/02; C08d 1/18; C08d 3/04
[58] Field of Search ...................... 260/94.3, 94.7 H

[56] References Cited
UNITED STATES PATENTS

| | | | |
|---|---|---|---|
| 3,432,518 | 3/1969 | Kallenbach | 260/94.9 |
| 3,525,729 | 8/1970 | Gaeth | 260/94.3 |
| 3,739,003 | 6/1973 | Codet et al. | 260/94.3 X |

*Primary Examiner*—William F. Hamrock
*Attorney, Agent, or Firm*—Millen, Raptes & White

[57] ABSTRACT

Conjugated diolefins are first converted to polymers in the presence of specific derivatives of transition metal carboxylates, for example an etherate of trifluoracetato nickel halide. The crude polymer containing catalyst residues is admixed with a reducing metal compound, for example triethylaluminum, and a hydrogen pressure is applied thereto. The final product is a partially or totally hydrogenated polymer. Specific hydrogenated butadiene polymers may be obtained therefrom.

25 Claims, No Drawings

PROCESS FOR MANUFACTURING HYDROGENATED POLYMERS FROM CONJUGATED DIOLEFINS

CROSS-REFERENCE TO RELATED APPLICATION

This application is a continuation-in-part of copending application Ser. No. 267,523 filed June 29, 1972, now abandoned.

This invention concerns a new, simple, and advantageous process for the industrial manufacture of hydrogenated polymers, which comprises polymerizing or copolymerizing monomers in the presence of a monometallic catalyst and contacting the resulting polymer with hydrogen in the presence of a metallic reducing compound.

The invention relates particularly to a process for manufacturing hydrogenated polymers from conjugated diolefins, which comprises, in a first step, a polymerization in the presence of a derivative of a transition metal carboxylate, and, in a second step, the hydrogenation of the polymer as a viscous solution, by adding a reducing metallic compound.

One of the objects of this invention is to provide an advantageous process for hydrogenating a polymerized unsaturated compound such as obtained, without purification, from its production unit, the catalyst residue from the polymerization step being used as catalyst component for subsequent hydrogenation.

Another object of the invention is to make use in hydrogenation catalysis of a metal compound introduced initially to produce the unsaturated polymer.

Another object of the invention is to provide new two-component catalysts which may be used for polymerizing conjugated diolefins and hydrogenating the resulting polymer.

A further object is to provide a process for manufacturing new polymers.

The conventional processes for manufacturing hydrogenated polybutadiene by polymerization of 1,3-butadiene, followed with a hydrogenation of the resulting polymer, are carried out with 3-component catalysts. For example, French Pat. No. 1,581,146 issued Aug. 4, 1969 discloses a catalyst composition comprising (1) a nickel or cobalt salt, (2) boron trifluoride and (3) an aluminum, magnesium or lithium organometal compound. The catalyst composition disclosed in the U.S. Pat. No. 3,560,405 issued Feb. 2, 1971 comprises (1) a molybdenum trihalide dicarboxylate and the mixture of (2) an organoaluminum compound or lithium aluminum hydride with (3) a nickel compound.

It has now unexpectedly been found that, by carefully selecting the transition metal compound and the order of introduction of the reactants, the polymerization and the hydrogenation of the polymer may be successively carried out in the presence of a 2-component catalyst, the polymerization taking place in the presence of a mono-metallic catalyst which, when a metallic reducing compound is added thereto, is transformed in situ into a very active hydrogenation catalyst.

One of the advantages of the process according to the invention is to make use of a 2-component catalyst with only one transition metal.

Another industrial advantage is to provide a method for manufacturing hydrogenated polymers in two steps, which is particularly well adapted to the development of a continuous process.

Another advantage of the process according to the invention is to make it possible to hydrogenate the raw product from the polymerization reactor.

Another advantage, according to a particular embodiment of the invention, is to provide new partially hydrogenated polymers having a microstructure that could not previously be obtained by direct co-polymerization of two monomers; for example, when starting with 1,3-butadiene, polymers may be manufactured, which consist essentially of 1,4-cis-butadiene units and butene units, of the formulae

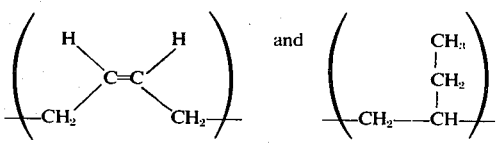

statistically distributed along the polymer chains.

Other advantages of this invention will be made apparent to skilled chemists from the following description.

The hydrogenated polymer is prepared, according to this invention, as follows: there is first prepared, in liquid phase, the polymer containing hydrogenizable double bonds in the presence of a derivative of a transition metal carboxylate of the general formula:

in which each X is halogen, preferably fluorine; $n$ is zero or an integer selected from 1, 2 and 3; M is a transition metal of the groups IV to VIII of the periodic classification of the elements, preferably molybdenum, tungsten, nickel or cobalt; each R is a hydride ion, a halogen atom, a hydrocarbon radical or a carbonyl group; m is an integer from 1 to 4; inclusive L is a Lewis base containing at least one ether, alcohol or ketone group; $p$ is zero, 1 or 2 and $q$ is an integer, preferably 1 or 2.

These compounds may be easily obtained according to processes described in the prior art; they are usually in the form of solid, sometimes crystalline products which may be stored easily, and they are sufficiently soluble in various media to be easily handled and used in the form of solutions.

As examples, the following compounds may be mentioned:

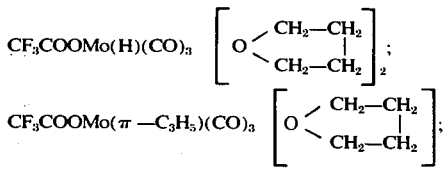

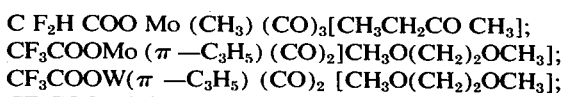

C $F_2$H COO Mo ($CH_3$) $(CO)_3[CH_3CH_2CO\ CH_3]$;
$CF_3COOMo$ ($\pi$—$C_3H_5$) $(CO)_2]CH_3O(CH_2)_2OCH_3]$;
$CF_3COOW(\pi$—$C_3H_5$) $(CO)_2$ $[CH_3O(CH_2)_2OCH_3]$;
$CF_3COO\ Ni\ Cl$;
$CF_3COO\ Ni\ Cl\ [O\ (C_2H_5)_2]$;
$CF_3\ COO\ Ni\ Br\ [O\ (C_2H_5)_2]$;
$CF_3COO\ Co\ Br$;
$[CF_3COO\ Ni\ (\pi\ —\ C_3H_5)]_2$;
C $Cl_3$ COO Ni $[(\pi - C_4H_7)]_2$; and
$CF_3$ COO Mo ($\pi$—$C_3H_5$) $(CO)_2$ $[CH_3O\ (CH_2)_2OH]$ The hydrogenation of the resulting polymer is carried out thereafter by putting the reaction solution under a sufficient pressure of hydrogen and adding a compound of aluminum, zinc, magnesium or alkali metal, for example lithium or sodium, said compound having one of the formulae $R'_{m'} M'X'_{n'}$, $M''Al H_{p'} X'_{4-p'}$ and $R'_{q'} M'$, where $R'$ is an aromatic, a saturated aliphatic or a saturated cycloaliphatic hydrocarbon radical, or a combination thereof, containing 1–20 carbon atoms, $m'$ is an integer from 1 to 3 inclusive, $M'$ is aluminum, zinc, lithium, sodium or magnesium, $M''$ is lithium or sodium, $X'$ is a halogen atom, a monovalent hydrocarbon radical or an $OR$, $NR_2$ or $NHR$ group where R is a monovalent hydrocarbon radical, $n'$ is 0, 1 or 2, $p'$ is zero or an integer from 1 to 4 inclusive and $q'$ is an integer equal to the valence of the metal $M'$ and which may take values from 1 to 3, inclusive As examples of metal compounds to be used either alone or as mixtures, there will be mentioned: trimethylaluminum, monoethoxydiethylaluminum, triisobutylaluminum, triphenylaluminum, ethyl lithium, n-butyllithium, isobutylsodium, phenyl lithium, phenyl sodium, diethylzinc, dibutylzinc, diethylmagnesium, dibutylmagnesium, diphenylmagnesium, diethyl aluminum chloride, ethyl aluminum sesquichloride, butyllithium-aluminum trihydride, lithium aluminum tetrahydride, sodium-aluminum hydride tributylate, diphenylaluminum chloride, phenylmagnesium bromide, t-butylmagnesium chloride, and triethylaluminum.

Among the above metal compounds, triethylaluminum and triisobutylaluminum are preferably used in account of their availability.

The molar ratio of the reducing metal compound to the derivative of the transition metal carboxylate may be widely varied, but the preferred molar ratio is selected from 1/1 to 20/1; a molar ratio of from 2/1 to 5/1 is particularly preferred since it provides a hydrogenation catalyst of high activity.

The concentration of the derivative of the transition metal carboxylate used in the process according to the invention may also vary rather widely; it is advantageously selected from $0.5 \times 10^{-3}$ to $5 \times 10^{-2}$ moles per liter of reaction solution, these values being not limitative.

As solvents to be used in the manufacture of hydrogenated polymers, according to the process of the invention, aliphatic or cycloaliphatic saturated hydrocarbons, aromatic hydrocarbons and their halogenated derivatives may be mentioned. Hexane, heptane, octane, cyclohexane, benzene, toluene, xylene chlorobenzene, ortho-dichlorobenzene and their mixtures are examples thereof.

The hydrogen pressure may be varied widely when hydrogenating the polymer; 1 atmosphere of hydrogen may be sufficient, but a substantially higher hydrogen pressure is preferred, usually 10–30 atmospheres.

Reaction temperatures of from 0° to 120°C and preferably 30° to 120°C are preferred, although the latter constitute no limitation. However, when the temperature is lower than 0°C, the hydrogenation rate is very low; on the other hand, when the temperature is higher than 120°C, a breaking of the polymer chain often takes place. Further, a moderate temperature is preferred when the selective hydrogenation of the unsaturated bonds of a stereoregular polymer is desired.

According to the process of this invention, the hydrogenation easily takes place in the viscous solution of the polymer. The polymer concentration in the reaction solution may vary according to the nature and the molecular weight of the polymer; it is usually between 1 and 50 % by weight and preferably between 10 and 30 %. The viscosity of the solution of the polymer to be hydrogenated may vary over a wide range; for example, a solution of a viscosity between 0.05 and 5,000 poises, preferably between 1 and 2,000 poises, may be used.

According to a preferred embodiment, the polymerization reaction must have sufficiently progressed, at least 90 % of monomer conversion, before the hydrogenation is carried out, so as to avoid the elimination of the residual monomer which otherwise would lead to hydrogenation by-products.

The process according to the invention may be advantageously used for manufacturing at least partially hydrogenated polymers and copolymers from conjugated diolefins of 4–12 carbon atoms such as, for example, 1,3-butadiene, 1,3-pentadiene, isoprene, piperylene, 1,3-dimethyl butadiene, used alone or as mixtures. As a matter of fact, any monomer may be used according to this invention, which polymerizes in the presence of a transition metal carboxylate and gives a polymer having hydrogenizable unsaturated bonds.

According to the particular reaction conditions, there may be prepared polymers with various microstructures, molecular weights and residual unsaturation ratios; the double bonds of the polymer may be selectively hydrogenated, according to their degree of substitution, since the vinyl double bonds of the $-CH=CH_2$ type hydrogenate faster than the internal double bonds of the $-CH=CH-$ type.

According to a particular embodiment, when working with 1,3-butadiene in the presence of a derivative of a molybdenum carboxylate, there may be obtained by the process of this invention, new polymeric products, which contain 55–85 % of butene units, 45–15 % of 1,4 cis-butadiene units, less than 10 % of hydrogenated 1,4- butadiene units and less than 5 % of 1,2-butadiene units, said products being not obtainable up to now, in the present state of the technique, by the direct co-polymerization of 1,3-butadiene and 1-butene.

After hydrogenation, the solvent and the catalyst are easily separated from the hydrogenated polymers by adding to the reaction mixture a polar solvent such as an alcohol, a ketone or water containing a small amount of acid and precipitating the polymer, or by steam-stripping of the solvent. A highly efficient separation of the catalyst residues is obtained by adding a chelating agent in small amounts to the reaction mixture, for example acetylacetone or the disodium salt of ethylene diamine tetracetic acid, and optionally extracting the new compounds with an appropriate solvent, before isolating the hydrogenated polymer.

The hydrogenated polymers manufactured according to the process of this invention, have, in the crude state, improved properties such as resiliency, heat stability and oxidation stability; the cold-flow of the polybutadienes is reduced and they can be diluted more easily with oil. Further, the partially hydrogenated polymers according to this invention may be easily vulcanized according to conventional techniques and consequently used in rubber applications.

The invention is illustrated in further detail by the following examples which constitute no limitation of the scope thereof.

EXAMPLE 1

20 cc of a toluene solution containing 1.43 g of the compound:

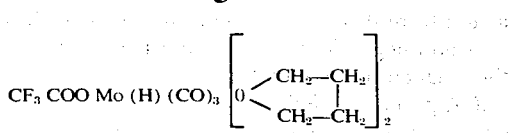

are added to a solution of 324 g of 1,3-butadiene in 1,000 cc of toluene and the reaction mixture is stirred at 50°C; after 15 minutes, corresponding to a butadiene conversion of about 93 % (66% to a 1,2-polymer and 27 % to a cis-1,4-polymer), there are added 10 cc of a toluene solution containing 1.42g of triethyl aluminum $(C_2H_5)_3Al$ and the reactor is maintained under 20 atmospheres of hydrogen. After 2 hours of stirring at 50°C, small amounts of hydrochloric acid and acetylacetone are added to destroy the catalyst and, after several extractions with ethylene glycol, the polymeric solution is poured into methyl alcohol. The polymer is isolated by decantation and dried under vacuo up to constant weight. 317 g of polymer are obtained with less than 100 ppm of residual metal. The intrinsic viscosity of the polymer, determined at 30°C in toluene, is 0.2 dl/g. The analysis of the polymer by infra-red spectrophotometry and nuclear magnetic resonance shows —$(CH_2)_4$— and $CH_3$ groups of hydrogenated butadiene molecules; the microstructure of the polymer consists of 9 % 1,4 cis units, 21 % hydrogenated 1,4-units and 70 % hydrogenated 1,2-units corresponding to the butene units.

EXAMPLE 2

Example 1 is repeated, except that the hydrogenation is discontinued after one hour, all other conditions being unchanged; the residual unsaturation is about 28 % and the microstructure of the polymer comprises 25 % of 1,4 cis units, 3 % of 1,2-vinyl units, 5 % of hydrogenated 1,4-units and 67 % of hydrogenated 1,2 - units.

EXAMPLE 3

0.41 g of the compound:

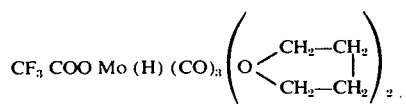

are added to a solution of 64 g of 1,3-butadiene in 1,000 cc of toluene. After stirring for 1 hour at 50°C, there is added 0.46 g of triethylaluminum $(C_2H_5)_3Al$ to the obtained product which contains 75 % of 1,2-polymer and 25 % of 1,4cis polymer. The reactor is heated to 80°C under 20 atmospheres of hydrogen. Hydrogen is immediately and quickly absorbed and additional hydrogen is added to maintain the pressure to a constant value. After 2 hours, the hydrogen supply is interrupted and the polymer is poured into isopropyl alcohol and isolated by filtration, washed with isopropyl alcohol, dried and weighed; there are obtained 46 g of a polymer having an intrinsic viscosity of 1 dl/g and whose residual unsaturation is 69 %. The microstructure of the polymer consists of 45 % of 1,2-vinyl units, 24 % of 1,4 cis units, 27 % of hydrogenated 1,2-units and 4 % of hydrogenated 1,4-units.

EXAMPLE 4

7 cc of a solution containing 82 g of the compound:

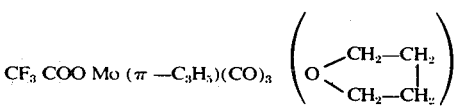

per liter of benzene are added to a solution of 130 g of 1,3-butadiene in 593 cc of normal heptane; the mixture is stirred at 50°C for 150 minutes and subjected to gas release at reduced pressure; it is diluted with 1,000 cc of normal heptane; 150 cc of a solution of 2.46 g of the molybdenum compound and 2.4 g of triethylaluminum in normal heptane are added thereto; hydrogen is introduced into the reactor at 80°C, so as to maintain a constant pressure of 25 kg/cm². After 90 minutes, the atmospheric pressure is restored in the reactor and the polymer is isolated. 114 g of a completely saturated polymer are obtained; the infra-red spectrum shows a major absorption at 1380 cm$^{-1}$, which is specific of the methyl group. The intrinsic viscosity of the resulting polymer is 0.63 dl/g.

EXAMPLE 5

1.4 g of monoetherate of trifluoracetato nickel chloride of the formula $CF_3 COO Ni Cl O(C_2H_5)_2$ is heated for 30 minutes in 400 cc of refluxing toluene; 260 g of 1,3-butadiene are added thereto and the reaction mixture is stirred at 50°C for 4 hours. The polymerization reactor is made free of gas and a solution of 0.96 g of butyl lithium $C_4H_9Li$ in toluene is added thereto. A hydrogen pressure of 20 atmospheres is maintained in the reactor at 50°C for 4 hours. After the gas release, the catalyst is destroyed by adding small amounts of water containing hydrochloric acid and the polymer is isolated by precipitation in isopropyl alcohol. The weight of the resulting polymer is 194 g: the residual unsaturation of the polymer is close to 20 % and the intrinsic viscosity is 2.1 dl/g.

EXAMPLE 6

100 cc of toluene and 13 g of 1,3-butadiene are added to 2.8 g of monoetherate of trifluoracetato nickel chloride of the formula $CF_3 COO Ni Cl O(C_2H_5)_2$ previously heated to 120°C for 30 minutes. After stirring for 75 minutes at 50°C, 100 g of butadiene and 100 cc of toluene are added thereto. After stirring for 3 hours at 30°C, the gas is removed from the polymerization reactor; then, 300 cc of toluene and 30 mM of Al Et$_3$ in 30 cc of n.heptane are added. A hydrogen pressure of 25 atm. is maintained in the reactor at 60°C for 4 hours. After the gas release, the polymer is isolated. There is obtained a polymer (100 grams) the residual unsaturation of which is 17 %.

EXAMPLE 7

Example 6 is repeated, except that the hydrogenation is carried out for only 2 hours, the other conditions being unchanged. The residual unsaturation is 45 %.

EXAMPLE 8

Example 6 is repeated, except that 3.0 of mono-etherate of trifluoracetato nickel bromide of the formula $CF_3 COO Ni Br O(C_2H_5)_2$ is used instead of the mono-etherate of trifluoracetato nickel chloride. The polymer obtained (93 grams) has a residual unsaturation of 18%.

EXAMPLE 9

104 g of 1,3-butadiene are added to a solution of 1.7 g of bis- $\pi$ -allyl nickel trifluoracetate of the formula [$CF_3COONi$ ($\pi$- $C_3H_5$)]$_2$ in 400 cc of benzene; the reaction mixture is stirred at 30°C for 6 hours; 1.22 g of lithium aluminum hydride Li Al H$_4$ are added thereto and the stirring is continued for 3 hours at 60°C under 30 atm. hydrogen. A polymer (97 g) is obtained the microstructure of which consists of 60 % of hydrogenated 1,4-units, 31 % of 1,4-trans butadiene units, 9 % of 1,4-cis butadiene units and less than 1 % of butene units.

EXAMPLE 10

33 g of 1,3-butadiene and 34 g of isoprene are added to a suspension of 1.04 g of trifluoracetato nickel chloride in 50 cc of n-heptane. The reaction mixture is stirred at 70°C for 5 hours. 65 cc of n-hepatne and 1.71 g of triethylaluminum are added thereto. A hydrogen pressure of 25 atm. is maintained in the reactor at 70°C for 6 hours. 50 g of a co-polymer butadiene-isoprene is obtained, having a residual unsaturation of about 30 %.

EXAMPLE 11

Example 9 is repeated, except that 34 g of 1,3 pentadiene is used instead of isoprene, other conditions being unchanged. 52 g of a copolymer butadiene-pentadiene is obtained, having a residual unsaturation of about 40%.

What we claim is:

1. A process for manufacturing hydrogenated polymers or copolymers from at least one conjugated diolefin, which comprises a first step of manufacturing an unsaturated polymer or copolymer by solution polymerizing the conjugated diolefin of 4–12 carbon atoms in contact with a catalytic quantity of a derivative of a transition metal carboxylate of the formula:

$$[(H_{3-n}X_n)C - CO_2M\ (R)_m \cdot (L)_p]_q$$

where $n$ is 0, 1, 2 or 3, each X is a halogen atom, M is a transition metal of the groups IV to VIII of the periodic classification of the elements, each R is selected from the group consisting of a hydride ion, a halogen atom, a hydrocarbon radical and a carbonyl group, $m$ is an integer from 1 to 4 inclusive, L is a Lewis base containing at least one ether, alcohol or ketone group, $p$ is 0, 1 or 2 and $q$ is an integer, in the absence of any metallic reducing agent and a second step, of hydrogenating the raw product from the first step, containing residual catalyst from this step, under a sufficient pressure of hydrogen in the additional presence of a sufficient quantity of a catalyst component consisting essentially of a metallic reducing agent, to form in situ a hydrogenation catalyst with said residual catalyst.

2. A process as defined by claim 1, wherein the second step is carried out by reacting the solution resulting from the first step with hydrogen and adding as the metallic reducing agent at least one compound having one of the formulae R'$_m$M'X'$_{n'}$ ; M'' Al H$_{p'}$ X'$_{4-p'}$ and R'$_{q'}$ M', in which R' is an aromatic, a saturated cycloaliphatic hydrocarbon aliphatic or a saturated cycloaliphatic hydrocarbon radical or a combination thereof, containing 1–20 carbon atoms, $m'$ is an integer from 1 to 3 inclusive, M' is aluminum, zinc, lithium, sodium or magnesium, M'' is lithium or sodium, X' is a halogen atom, a monovalent hydrocarbon radical or an OR, NR$_2$ or NHR group, where R is a monovalent hydrocarbon radical, $n'$ is selected from 0, 1 and 2, $p'$ is from 0 to 4, inclusive and $q'$ is an integer from 1 to 3 inclusive which is equal to the valence of the metal M'.

3. A process as defined by claim 1, wherein X is fluorine or chlorine, M is molybdenum, tungsten, nickel or cobalt, each R is selected from the group consisting of a hydride ion, a chlorine atom, a bromine atom, a methyl radical, a $\pi$-allylic radical or a carbonyl group, L is selected from the group consisting of diethylether, 1,2 dimethoxyethane, ethylene-glycol monomethylether, tetrahydrofuran, and methyl ethyl ketone, and $q$ is 1 or 2.

4. A process as defined by claim 1 wherein the derivative of transition metal carboxylate is selected from the group consisting of

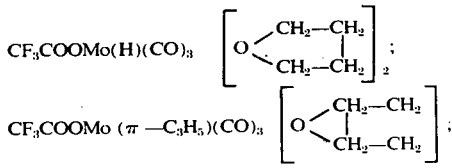

CF$_2$H COO Mo (CH$_3$) (CO)$_3$[CH$_3$CH$_2$COCH$_3$];
CF$_3$COOMo ($\pi$ —C$_3$H$_5$) (CO)$_2$ [CH$_3$)(CH$_2$O$_2$OCH$_3$];
CF$_3$COOW($\pi$—C$_3$H$_5$) (CO)$_2$ [CH$_3$O(CH$_2$)$_2$OCH$_3$];
CF$_3$ COO Ni Cl;
CF$_3$COO Ni Cl [O (C$_2$H$_5$)$_2$];
CF$_3$ COO Ni Br [O(C$_2$H$_5$)$_2$];
CF$_3$COO Co Br;
[CF$_3$COO Ni ($\pi$ — C$_3$H$_5$) ]$_2$;
C Cl$_3$ COO Ni [($\pi$ - C$_4$H$_7$) ]$_2$; and
CF$_3$ COO Mo ($\pi$—C$_3$H$_5$) (CO)$_2$ [CH$_3$O (CH$_2$)$_2$OH].

5. A process as defined by claim 1, wherein the derivative of transition metal carboxylate has the formula:

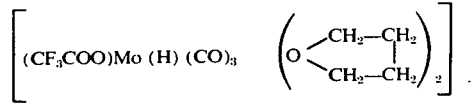

6. A process as defined by claim 1, wherein the derivative of transition metal carboxylate has the formula:

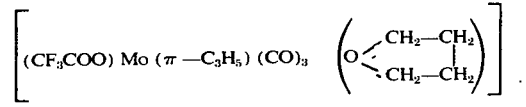

7. A process as defined by claim 1, wherein the derivative of transition metal carboxylate has the formula:

(CF$_3$COO)Ni Cl [O (C$_2$H$_5$)$_2$]

8. A process as defined by claim 1 wherein the derivative of transition metal carboxylate has the formula:

(CF$_3$COO) Ni Br ]O(C$_2$H$_5$)$_2$]

9. A process as defined by claim 1 wherein the derivative of transition metal carboxylate has the formula:

(CF$_3$ COO)Ni Cl

10. A process as defined by claim 1 wherein the derivative of transition metal carboxylate has the formula:

[(CF$_3$ COO) Ni ($\pi$—C$_3$H$_5$)]$_2$

11. A process as defined by claim 1 wherein the metallic reducing agent is selected from the group consisting of trimethylaluminum, monoethoxydiethylaluminum, tri-isobutylaluminum, triphenylaluminum, ethyl lithium, n-butyllithium, isobutylsodium, phenyl lithium, phenyl sodium, diethylzinc, dibutylzinc, diethylmagnesium, dibutylmagnesium, diphenylmagnesium, diethylaluminum chloride, ethyl aluminum sesquichloride, butyllithium-aluminum trihydride, lithium aluminum tetrahydride, sodium-aluminum hydride tributylate, diphenylaluminum chloride, phenylmagnesium bromide, t-butylmagnesium chloride, triethylaluminum, and mixtures thereof.

12. A process as defined by claim 1, wherein $n$ is 3; X is F; M is molybdenum, or nickel; each R is H, Cl, Br, $\pi$-allyl or carbonyl; $m$ is an integer of 1 to 4 inclusive; L is diethyl ether or tetrahydrofuran; $p$ is 0, 1 or 2; $q$ is 1 or 2: and the metallic reducing agent is triethylaluminum, butyllithium or lithium-aluminum hydrode.

13. A process as defined by claim 1, wherein the concentration of the derivative of transition metal carboxylate is from $0.5 \times 10^{-3}$ to $5 \times 10^{-2}$ mole per liter of reaction solution, the molar ratio of the reducing agent to said derivative of transition metal carboxylate is from 1/1 to 20/1, the hydrogen pressure is at least one atmosphere and the temperature is from 0° to 120°C.

14. A process as defined by claim 13 wherein the unsaturated polymer to be hydrogenated has a concentration in the raw product of 1–50% by weight and said raw product has a viscosity of 0.05–5,000 poises.

15. A process as defined by claim 14 wherein the hydrogenation pressure is 10–30 atmospheres.

16. A process as defined by claim 1 wherein at least 90% of the monomer in the first step is polymerized.

17. A process as defined by claim 1 wherein the conjugated diolefin is 1,3-butadiene, 1,3-pentadiene isoprene, piperylene, 1,3-dimethylbutadiene and mixtures thereof.

18. A process as defined by claim 1 wherein the conjugated diolefin is selected from the group consisting of 1,3 butadiene, 1,3 pentadiene and isoprene and mixtures thereof; $n$ is 3; X is F; M is molybednum or nickel; each R is H, Cl, Br, $\pi$-allyl or carbonyl; $m$ is an integer of 1 to 4 inclusive; L is diethylether or tetrahydrofura; $p$ is 0, 1 or 2; $q$ is 1 or 2; the metallic reducing agent is triethylaluminum, butyllithium or lithium-aluminum hydride; the concentration of said derivative of transition metal carboxylate is from $0.5 \times 10^{-3}$ to $5 \times 10^{-2}$ mole per liter of reaction solution; the molar ratio of said metallic reducing agent to said derivative of transition metal carboxylate is from 1/1 to 5/1; the hydrogen pressure is at least 1 atmosphere; and the temperature is from 30 to 120° C.

19. A process for manufacturing hydrogenated polymers or copolymers which comprises hydrogenating a solution containing a crude unsaturated polymer or copolymer and residual catalyst under a sufficient pressure of hydrogen, at a temperature of 0°–120°C, and in the presence of a metallic reducing agent selected from the group consisting of trimethylaluminum, monoethoxydiethylaluminum, tri-isobutylaluminum, triphenylaluminum, ethyl lithium, n-butyllithium, isobutylsodium, phenyl lithium, phenyl sodium, diethylzinc, dibutylzinc, diethylmagnesium, dibutylmagnesium, diphenylmagnesium, diethylaluminum chloride, ethyl aluminum sesquichloride, butyllithium-aluminum trihydride, lithium aluminum tetrahydride, sodium-aluminum hydride tributylate, diphenylaluminum chloride, phenylmagnesium bromide, t-butylmagnesium chloride, triethylaluminum, and mixtures thereof, said solution containing crude unsaturated polymer or copolymer and residual catalysts having been produced by solution polymerizing at least one conjugated diolefin of 4–12 carbon atoms in contact with a catalyst selected from the group consisting of

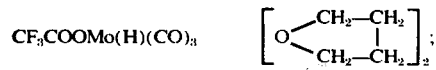

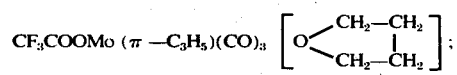

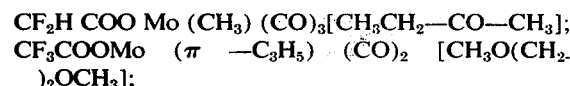

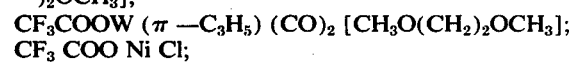

$CF_2H$ COO Mo $(CH_3)$ $(CO)_3[CH_3CH_2-CO-CH_3]$;
$CF_3COOMo$ $(\pi -C_3H_5)$ $(CO)_2$ $[CH_3O(CH_2)_2OCH_3]$;
$CF_3COOW$ $(\pi -C_3H_5)$ $(CO)_2$ $[CH_3O(CH_2)_2OCH_3]$;
$CF_3$ COO Ni Cl;
$CF_3COO$ Ni Cl $[O\ (C_2H_5)_2]$;
$CF_3$ COO Ni Br $[O(C_2H_5)_2]$;
$CF_3COO$ Co Br $[CF_3COO$ Ni $(\pi - C_3H_5)$ $]_2$;
C $Cl_3$ COO Ni $[(\pi - C_4H_7)$ $]_2$, and
$CF_3$ COO Mo $(\pi\ C_3H_5)$ $(CO)_2$ $[CH_3O\ (CH_2)_2OH]$,
said metallic reducing agent being essentially the only catalytic component added to the solution in the hydrogenation step and being added in sufficient quantities to form, in situ, a hydrognation catalyst, with said residual catalyst in said solution.

20. A process as defined by claim 19 wherein the metallic reducing agent is triethylaluminum or triisobutylaluminum, and the molar ratio of said metallic reducing agent to the catalyst employed in the production of the unsaturated polymer being about 2:1 to 5:1 respectively, the hydrogen pressure being at least 1 atmosphere, and the reaction temperature being about 0°–120° C.

21. A process as defined by claim 20 wherein the unsaturated polymer to be hydrogenated has a concentration in the raw product of 1–50% by weight and said raw product has a viscosity of 0.05–5,000 poises.

22. A process as defined by claim 21 wherein the hydrogenation pressure is 10–30 atmospheres.

23. A process as defined by claim 19 wherein not more than 10% free monomer is present in the solution to be hydrogenated.

24. A process as defined by claim 19 wherein the conjugated diolefin is 1,3-butadiene, 1,3 pentadiene isoprene, piperylene, 1,3-dimethylbutadiene and mixtures thereof.

25. A process for manufacturing hydrogenated polymers or copolymers, which comprises hydrogenating a solution containing a crude unsaturated polymer or copolymer and residual catalyst under a hydrogen pressure of at least 1 atmosphere, at a temperature of about 30° to 120°C, and in the presence of a metallic reducing agent selected from the group consisting of triethylaluminum, butyllithium and lithium aluminum hydride, said solution containing crude unsaturated polymer or copolymer and residual catalyst having been produced by solution polymerizing at least one conjugated diolefin selected from the group consisting of 1,3 butadiene, 1,3 pentadiene, isoprene and mixtures thereof, in contact with a catalyst consisting of a derivative of a transition metal carboxylate of the formula

in which $n$ is 3; X is F; M is molybdenum or nickel;

each R is H, Cl, Br, π-allyl or carbonyl; $m$ is an integer of 1 to 4 inclusive; L is diethylether or tetrahydrofuran; $p$ is 0, 1 or 2; ; $q$ is 1 or 2; the concentration of said derivative of transition metal carboxylate if from $0.5 \times 10^{-3}$ to $5 \times 10^{-2}$ mole per liter of reaction solution, said metallic reducing agent being essentially the only catalytic component added to the solution in the hydrogenation step and being added in a molar ratio to said derivative of transition metal carboxylate of from 1/1 to 5/1 to form in situ a hydrogenation catalyst with said residual catalyt in said solution.

* * * * *